No. 667,123. Patented Jan. 29, 1901.
H. F. FREED.
ELECTRIC PROTECTIVE SYSTEM.
(Application filed Aug. 31, 1900.)
(No Model.) 6 Sheets—Sheet 1.
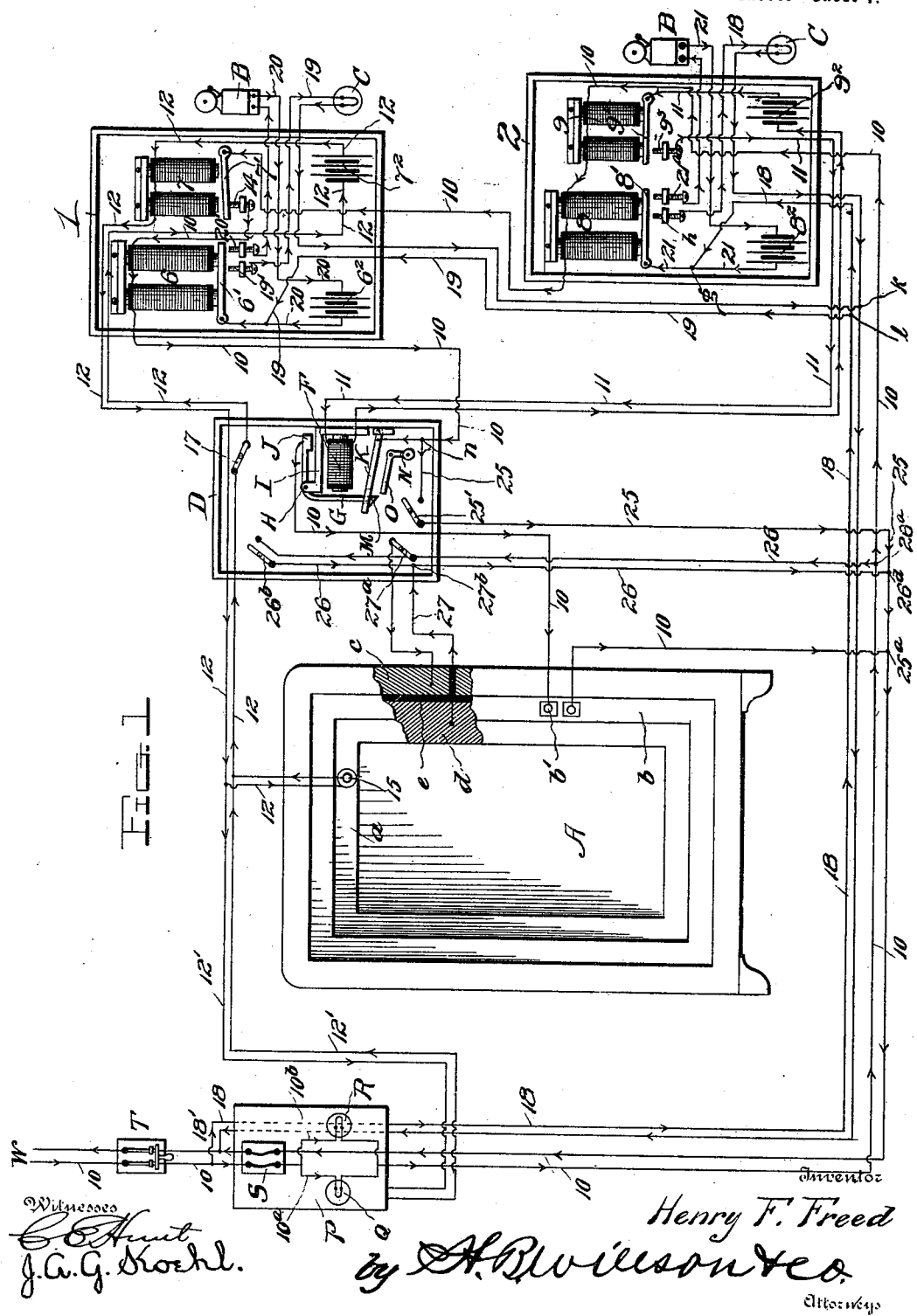
Witnesses
C. E. Hunt
J. A. G. Koehl.
Inventor
Henry F. Freed
by H. B. Willson & Co.
Attorneys No. 667,123. Patented Jan. 29, 1901.
H. F. FREED.
ELECTRIC PROTECTIVE SYSTEM.
(Application filed Aug. 31, 1900.)
(No Model.) 6 Sheets—Sheet 2.
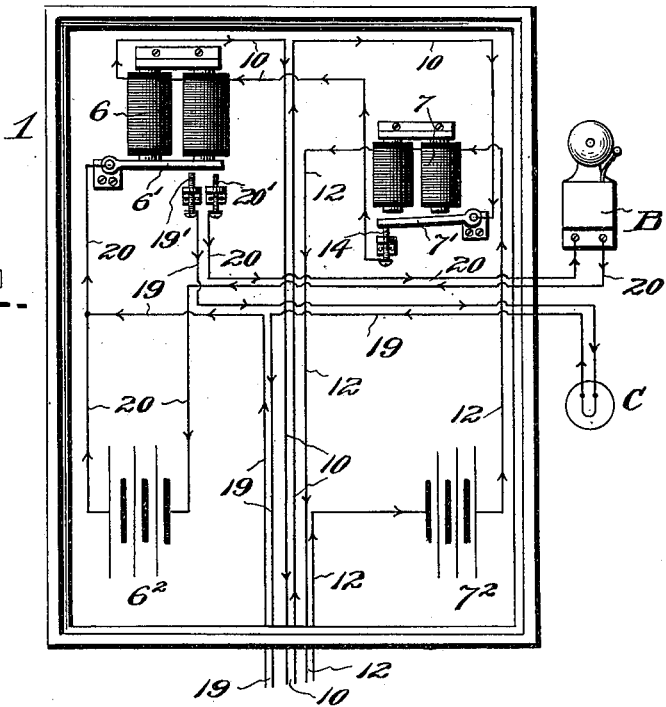
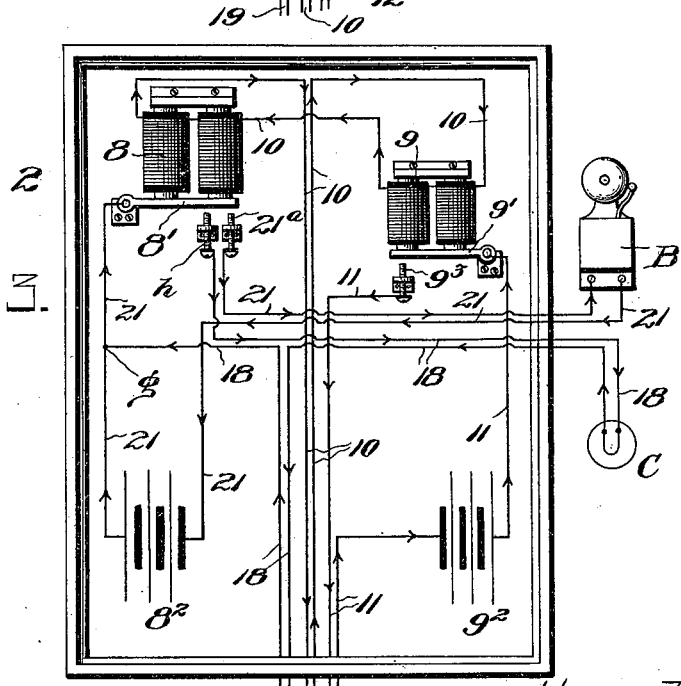
Inventor
Henry F. Freed No. 667,123. Patented Jan. 29, 1901.
H. F. FREED.
ELECTRIC PROTECTIVE SYSTEM.
(Application filed Aug. 31, 1900.)
(No Model.) 6 Sheets—Sheet 3.

Witnesses
C. E. Hunt.
J. C. G. Koehl

Inventor
Henry F. Freed
by H. B. Willson & Co.
Attorneys

No. 667,123. Patented Jan. 29, 1901.
H. F. FREED.
ELECTRIC PROTECTIVE SYSTEM.
(Application filed Aug. 31, 1900.)

(No Model.) 6 Sheets—Sheet 4.

Inventor
Henry F. Freed
by H. B. Willson & Co.
Attorneys

Witnesses
C. E. Hunt
J. A. G. Koehl.

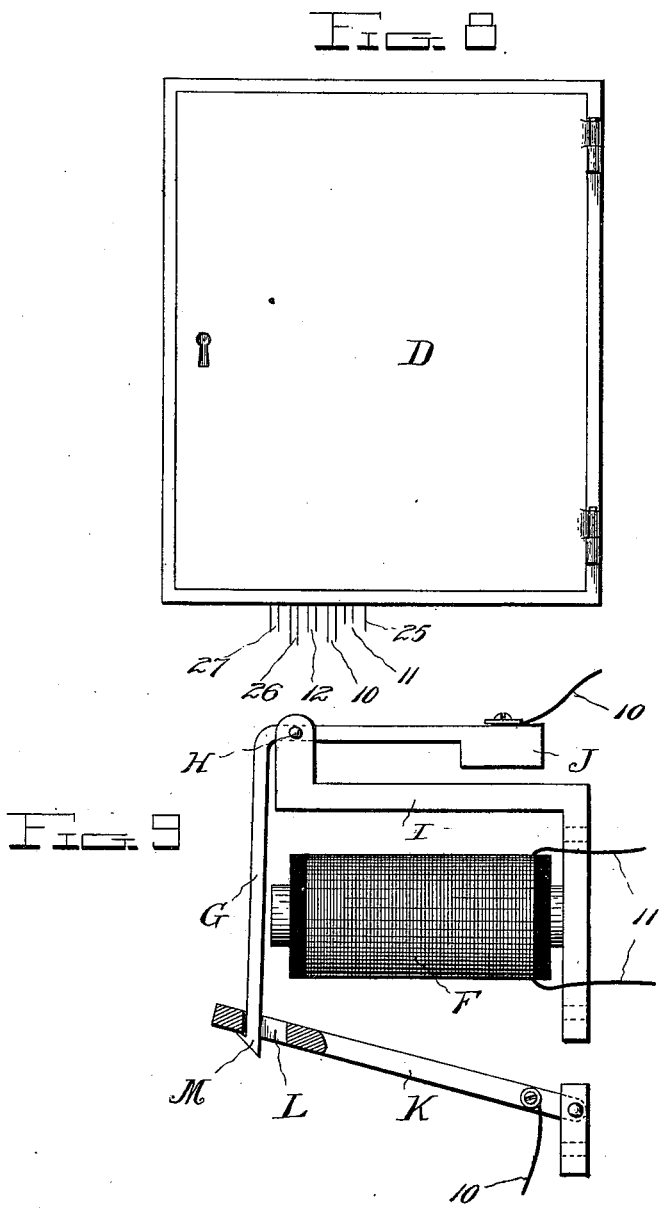

No. 667,123. Patented Jan. 29, 1901.
H. F. FREED.
ELECTRIC PROTECTIVE SYSTEM.
(Application filed Aug. 31, 1900.)
(No Model.) 6 Sheets—Sheet 6.

Witnesses
Inventor
Henry F. Freed
by H. B. Willson & Co.
Attorneys

UNITED STATES PATENT OFFICE.

HENRY F. FREED, OF HARRISBURG, PENNSYLVANIA.

ELECTRIC PROTECTIVE SYSTEM.

SPECIFICATION forming part of Letters Patent No. 667,123, dated January 29, 1901.

Application filed August 31, 1900. Serial No. 28,677. (No model.)

*To all whom it may concern:*

Be it known that I, HENRY F. FREED, a citizen of the United States, residing at Harrisburg, in the county of Dauphin and State of Pennsylvania, have invented certain new and useful Improvements in Electric Protective Systems; and I do declare the following to be a full, clear, and exact description of the invention, such as will enable others skilled in the art to which it appertains to make and use the same.

The invention relates to an electric protective system particularly designed for use in connection with safes, vaults, buildings, and other structures.

The object of the invention is to provide a new and useful system of this character which will effectually guard against the entrance to a safe, vault, house, or other structure by an unauthorized person by sounding an alarm and displaying a danger-signal, the circuits being so controlled that after the alarm is once sounded it continues and can only be stopped by a person having the key or combination of the switch-controlling box; furthermore, to provide means whereby should any or all the circuits be short-circuited in the act of cutting the wires the danger-signal will be displayed and the alarm sounded continuously, and, finally, to provide a simple, inexpensive, and positively burglar-proof system of this character.

Figure 4:
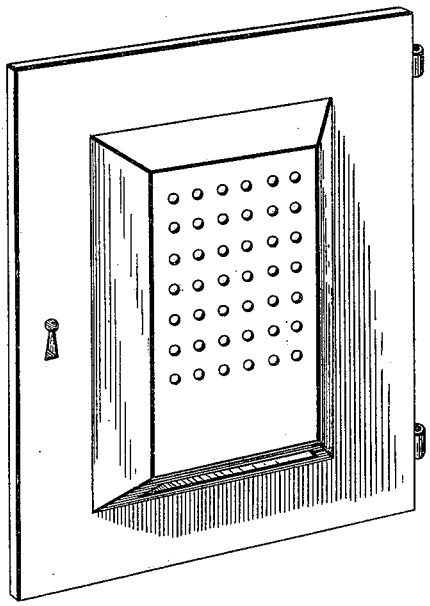
Figure 5:
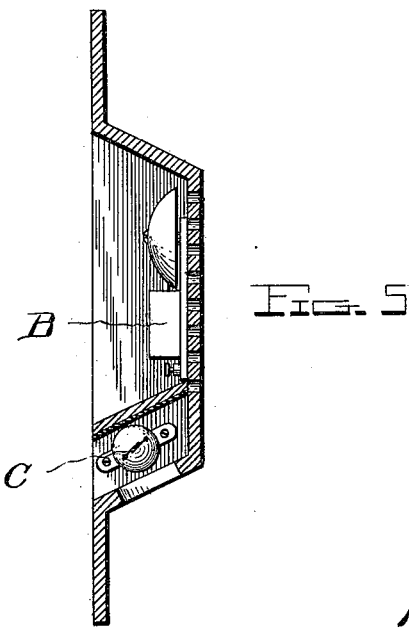
Figure 6:
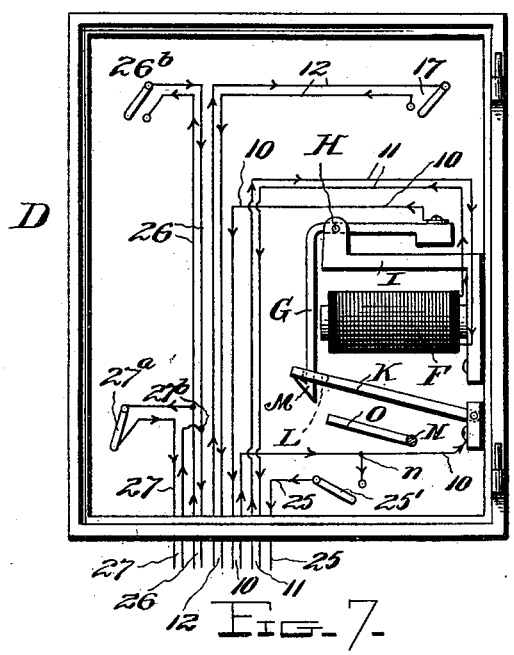
Figure 7:
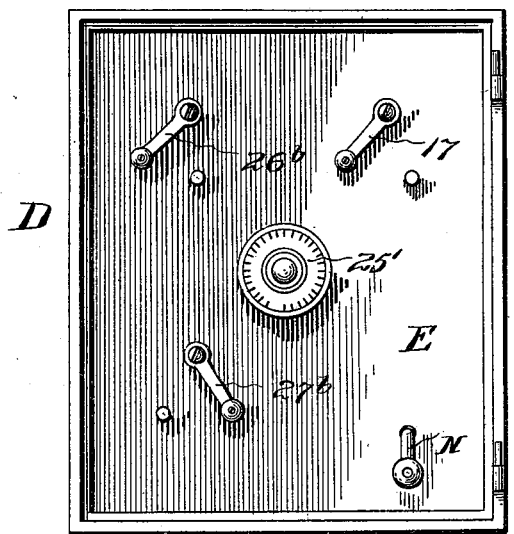
Figure 10:
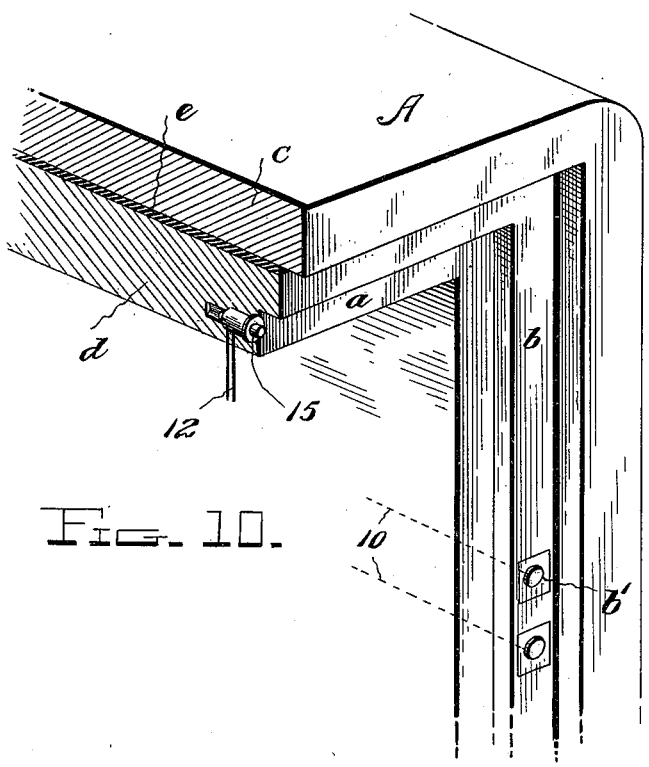
Figure 11:
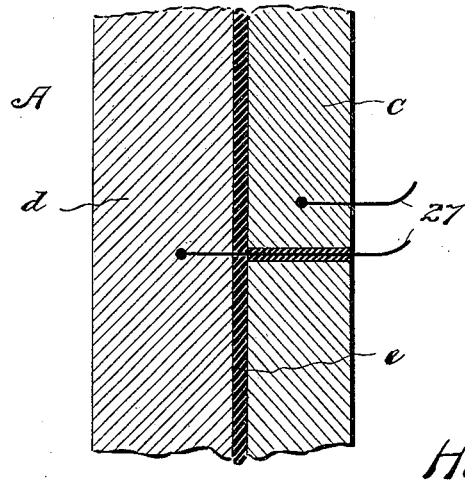

In the accompanying drawings, Figure 1 is a diagrammatic view illustrating my improved system. Fig. 2 is a front elevation of the primary-alarm boxes, the door being removed. Fig. 3 is a similar view of the auxiliary-alarm box. Fig. 4 is a perspective view of the door used to close each box. Fig. 5 is a vertical sectional view through the door with the lamp and alarm-bell in position. Fig. 6 is a front elevation of the switch-controlling box, the door and the switchboard being removed to illustrate its contained cut-out magnet and its accessories. Fig. 7 is a similar view with the switch-plate in position. Fig. 8 is a similar view with the door in position. Fig. 9 is an enlarged view of the circuit-breaker. Fig. 10 is an enlarged view of a portion of the safe, showing it in conventional form, illustrating the open and closed circuit connectors; and Fig. 11 is a sectional view through one of the walls of the safe.

In the drawings, A denotes a safe, vault, or other structure desired to be rendered burglar-proof, and in this instance is shown constructed to be equipped with inner and outer doors, the jamb $a$ to receive the inner door and the jamb $b$ to receive the outer door. The thicknesses $c$ and $d$ of the doors and walls of the structure are preferably separated by an insulating lining $e$ for a purpose hereinafter to appear.

1 denotes the primary-alarm box and 2 the auxiliary-alarm box, one of which is preferably located in the building in which the safe or vault is placed and the other of which may be located on the outside of the building within plain view of persons passing along the street, or may be located at police-headquarters or any other desirable point. Each alarm-box is provided with a hinged door and with means for locking it closed and supports an electric gong B and a lamp C.

The box 1 is provided with an electromagnet 6, having a pivoted armature 6', adapted to fall by gravity away from the magnet. Said box 1 is also provided with an electromagnet 7, having a pivoted armature 7', which, like the armature 6', is adapted to fall by gravity away from its magnet.

The box 2 contains electromagnets 8 and 9 and pivoted armatures 8' and 9', which are respectively influenced by the magnets 8 and 9. These armatures swing down by gravity away from the magnets 8 and 9.

$6^2$ and $7^2$ denote open-circuit batteries in the box 1, and $8^2$ and $9^2$ denote open-circuit batteries in the box 2.

D denotes the switch-controlling box, which is provided with a hinged door and means for locking it closed and with a switchboard E.

F denotes an electromagnet of a circuit-breaker placed within the box at the inner side of the switchboard. G denotes the armature of this magnet, which is hinged at H to a frame I, which supports the magnet, and is provided with a weighted arm J, which normally holds the armature away from the magnet.

K denotes a suitably-pivoted circuit-breaker arm, which has a hooked engagement with the lower end of the armature G, which engagement is preferably effected by forming the free end of the circuit-breaker arm with an aperture L, into which projects the hooked end M of the lower end of the armature. When the magnet F is energized, it attracts the armature G and disconnects it from the arm K and permits the latter to drop out of electrical connection with the armature.

N denotes a shifter journaled in the switchboard and provided with an operating-knob at its outer end and at its inner end with an arm O, which is adapted to move in the path of the circuit-breaker arm K and elevate said arm into engagement with the hooked end of the armature G.

P denotes the main switchboard, Q and R lamp-sockets secured thereto, and S fuse cut-outs.

T denotes the main-line switch.

I will now trace the main-line closed circuit. Starting at the point W, which latter represents the source of electrical supply, the wire 10 passes through the main-line switch T, thence through one of the fuse cut-outs S, and then has branch wires $10^a$ and $10^b$, in which are installed the lamp-sockets Q and R. The wire 10 continues from the branches to which it is electrically connected and leads to the electromagnets 9 and 8, and thence to the armature of the magnet 7, through which the current flows and from which it passes to a regulating-screw 14. The wire 10 leads from the screw 14, thence through the electromagnet 6, thence into the switch-controlling box D, and is connected with the pivoted end of the circuit-breaker arm K. The current flows through the arm K and armature G. The wire 10 is connected to the arm J of the armature and leads to the closed-circuit connector $b'$ through the connector when the outside safe-door is closed, thence through the fuse cut-out, and thence leads through the switch T to the point of supply, thus completing the circuit.

11 denotes an open circuit, which I will now proceed to trace. Starting at the battery $9^2$ the circuit-wire 11 connects with the armature $9'$ of the magnet 9, the current flowing through said armature and through a set-screw $9^3$ when said armature $9'$ is demagnetized. The wire 11 extends from the set-screw $9^3$, through magnet F in the switch-controlling box, and thence back to the opposite pole of the battery.

12 denotes an open circuit, which leads from the positive pole of the battery $7^2$, through the electromagnet 7, through the open-circuit connector 15, thence to the switch 17, arranged within the switch-controlling box, and thence back to the negative side of the battery. Branch wires $12'$ $12'$ connect with the wire 12 and lead to the switchboard and are used for a purpose hereinafter to appear.

20 denotes the open alarm-circuit for the primary alarm. The circuit-wire leads from the positive side of the battery $6^2$, through the armature $6'$, and through the contact-screw $20'$ when said armature is demagnetized, and from thence through the magnet of the bell and back to the negative side of the battery.

21 denotes the open alarm-circuit 2. The wire leads from the positive side of the battery $8^2$ to the armature $8'$ and to the contact-screw $21^a$ when said armature is demagnetized, and from thence to the magnet of the bell and back to the negative side of the battery $8^2$.

18 denotes the lamp-circuit, which leads from the main circuit 10 at a point in the circuit before it passes through the fuse cut-out. I will now proceed to trace this circuit. Starting from the point $18'$, the wire 18 extends back of the switch-box P and makes junction with the circuit 21 at the point $g$. The current then flows along the wire 21, through the armature $8'$ of the magnet 8 when the magnet 8 is demagnetized, and thence through a contact-screw $h$. The wire thence leads from this screw through the lamp and thence back to and taps with the opposite wire of the main-line circuit.

19 denotes the lamp-circuit of the primary-alarm box 1. This circuit is branched into the circuit 18 at the points $k$ and $l$. The wire 19 extends into the box 1, joins with the wire 20, and conducts the current through said wire 20 to the armature $6'$ of the magnet 6 when the magnet 6 is demagnetized. The current thence passes through the contact-screw $19'$, thence through the wire 19, through the lamp, and back to the point $k$, where it joins the main closed circuit.

25 denotes a shunt-wire which joins the main-line circuit 10 at $n$ and leads to a switch $25'$, operated from within the box D, and thence leads to and connects with the main-line circuit at $25^a$.

26 denotes a shunt-circuit the wire of which extends from point $26^a$ up within the controlling-switch box D and through the switch $26^b$, and thence back, and is connected at $26^d$ to the wire 25, which joins the main-line circuit 10 at $25^a$, thus completing the shunt-circuit when switch $26^b$ is closed.

27 denotes a direct short circuit, one wire of which taps the circuit 26 through switch $27^a$ in box D and leads to thickness C of the safe. The other wire of this circuit is connected to the thickness $d$ of the safe and returns to the circuit-wire 26 and is connected thereto at $27^b$.

In operation, assuming the various parts of the system to be in the position shown in Fig. 1, with the main-line circuit closed, the lamp-circuits open, and the bell-circuits open and a lamp at one of the sockets Q and R displaying a light, which would indicate that the system was in perfect working order, should an unauthorized person attempt to gain access to the safe or vault by opening the outer door, the instant the door is moved outward the main-line circuit is broken, thus releasing the armatures of magnets 6, 8, and 9 and permitting them to fall in contact with their respective contact-screws $19'$, $20'$, $h$, $21^a$, and $9^3$, thus completing the alarm and alarm-circuits and thus sounding an alarm and displaying the danger-signals. The alarm is caused to continue its operation by the demagnetization of the electromagnet 9, which completes the circuit 11, energizes the electromagnet F, and withdraws its armature from the arm, thus freeing said arm from electrical contact with said armature, so that should the door be instantly closed by the burglar to stop the alarm said circuit cannot be closed or restored to its normal condition unless arm $k$ is moved into electrical contact with the armature G, and this can only be done by a person having the key or combination to the switch-controlling box, which after it has been opened will permit of the resetting of the breaker-arm K by the shifter-arm O. Now suppose it possible for an unauthorized person to open the outer safe-door without sounding the alarm or displaying lights. The instant he moves the inner safe-door outward the circuit 12 is closed, which energizes the magnet 7, thus breaking the main-line circuit 10 at the contact-screw 14 and causing the alarm to be sounded and the danger-lights to be displayed. In breaking the circuit 10 and closing the circuit 12 by the attraction of the armature $7^r$ to the magnet 7 the magnets 6, 8, and 9 are demagnetized, thus allowing their respective armatures to drop and close their respective circuits to cause the alarm to be sounded and the lamps to be displayed. The armature 9' in completing its circuit 11 energizes the magnet F, which repeats the action above set forth—that is, releases the breaker-arm K—thus causing the alarm to be continuously sounded and the lights to be continuously displayed whether or not the person instantly closes the door. The knobs to the various switches on the switchboard within the controlling-box D are of course arranged on the outer side of the switchboard, so as to be within convenient position for manipulation. Should a person possibly gain access to the interior of the box D and be under the impression that by reversing the switches from the positions which they occupy he would possibly be able to cut off the current without sounding an alarm, this naturally would be the first thing he would do. If a person simply turned the knobs to all the switches except the knob to the switch $26^b$, he would accomplish his purpose; but not being able to distinguish between these knobs and the knob to the switch $26^b$ should he reverse the position of the knob of the switch $26^b$ with the others he would short-circuit the main-line current by blowing out the fuse cut-outs, whereupon the alarm would be sounded and the lights displayed, as hereinbefore set forth. The various wires leading to the switchboard P and the box D are twisted or wrapped together, and if a person attempts to cut these wires he will short-circuit the system, and thus sound the alarm. Should an attempt be made to blow the safe open by introducing a charge of explosive material into a hole drilled through the safe, the burglar in drilling through the outer thickness of the safe the instant his drill strikes the inner thickness completes the circuit through the short-circuit wire 27, thus short-circuiting the system and causing the fuse cut-outs to be blown out, thus breaking the main-line circuit 10 and causing the alarm to be sounded and the lights to be displayed in a manner hereinbefore stated. When it is desired by a duly-authorized person to open the safe, he first opens the door of the box D and adjusts the switch 25', which is preferably in the form of a combination-lock tumbler, and closes the main-line circuit 10 through the shunt 25. This enables the outer door to be opened. To allow of the opening of the inner door without sounding an alarm, the switch 17 is opened, thus keeping the circuit 12 open when the inner door is opened.

The particular form of cover used for each alarm-box and shown in Figs. 4 and 5 of the accompanying drawings is covered in a separate application for patent filed of even date herewith. The circuit-breaker shown in Fig. 9 is also made the subject-matter of a separate application for patent. Therefore it is deemed unnecessary to enter into a detailed description of the combination, operation, and advantages of these features in the present application.

Having thus fully described my invention, what is claimed as new, and desired to be secured by Letters Patent, is—

1. An electric protective system, comprising a closed circuit, electromagnets included in said circuit, an open circuit closed by the demagnetization of the armature of one of said electromagnets, an automatic circuit-breaker included in the closed circuit and having an electromagnet included in the open circuit, an open signal-circuit closed by the breaking of the closed circuit, and a short circuit branched into the closed circuit and provided with a dummy switch for short-circuiting the main circuit.

2. An electric protective system, comprising a closed circuit, electromagnets included in said circuit, an open circuit closed by the demagnetization of the armature of one of the said electromagnets, an automatic circuit-breaker included in the closed circuit and having an electromagnet included in the open circuit, a closed-circuit connector for the closed circuit, and a second open circuit having an open-circuit connector and an electromagnet included in the last-named open circuit and having its armature when demagnetized included in the closed circuit.

In testimony whereof I have hereunto set my hand in presence of two subscribing witnesses.

HENRY F. FREED.

Witnesses:
BAUGH COWL,
SAML. A. DRURY.